United States Patent [19]
Kaiser et al.

[11] Patent Number: 5,410,888
[45] Date of Patent: May 2, 1995

[54] DISPENSER FOR SOFT-SERVE FROZEN DESSERT MACHINE

[75] Inventors: Lawrence R. Kaiser, Crestwood, Ky.; Kenneth R. Shipley, Memphis, Ind.; Robert Z. Whipple, Prospect, Ky.

[73] Assignee: Food Systems Partnership, Ltd., Louisville, Ky.

[21] Appl. No.: 160,479

[22] Filed: Dec. 1, 1993

[51] Int. Cl.⁶ ............................................. A23G 9/20
[52] U.S. Cl. ......................................... 62/136; 62/306; 62/303; 62/342; 251/30.01
[58] Field of Search ............... 62/136, 342, 343, 303, 62/69, 306; 251/30.01; 261/DIG. 16

[56] References Cited

U.S. PATENT DOCUMENTS

| | | | |
|---|---|---|---|
| 2,652,856 | 9/1953 | Welty et al. | 251/30.01 |
| 2,735,276 | 2/1956 | Thompson, Jr. | 62/69 |
| 3,203,371 | 8/1965 | Mosey | 261/DIG. 16 |
| 3,359,748 | 12/1967 | Booth | 62/136 |
| 3,402,562 | 9/1968 | Menzel | 62/69 |
| 3,823,571 | 7/1974 | Smith et al. | 62/136 |
| 3,989,492 | 11/1976 | Keyes | 62/136 |
| 4,157,017 | 6/1979 | Reid | 62/135 |
| 4,201,558 | 5/1980 | Schwitters | 62/70 |
| 4,314,451 | 2/1982 | Leeds | 62/68 |
| 4,463,572 | 8/1984 | Brown | 62/135 |
| 4,712,920 | 12/1987 | Ames et al. | 366/144 |
| 4,860,550 | 8/1989 | Aoki | 62/135 |
| 4,869,072 | 9/1989 | Sexton et al. | 62/136 |

Primary Examiner—William E. Tapolcai
Attorney, Agent, or Firm—Camoriano & Smith

[57] ABSTRACT

The frozen dessert machine of the present invention has an automated dispenser for controlling the portion size.

14 Claims, 12 Drawing Sheets

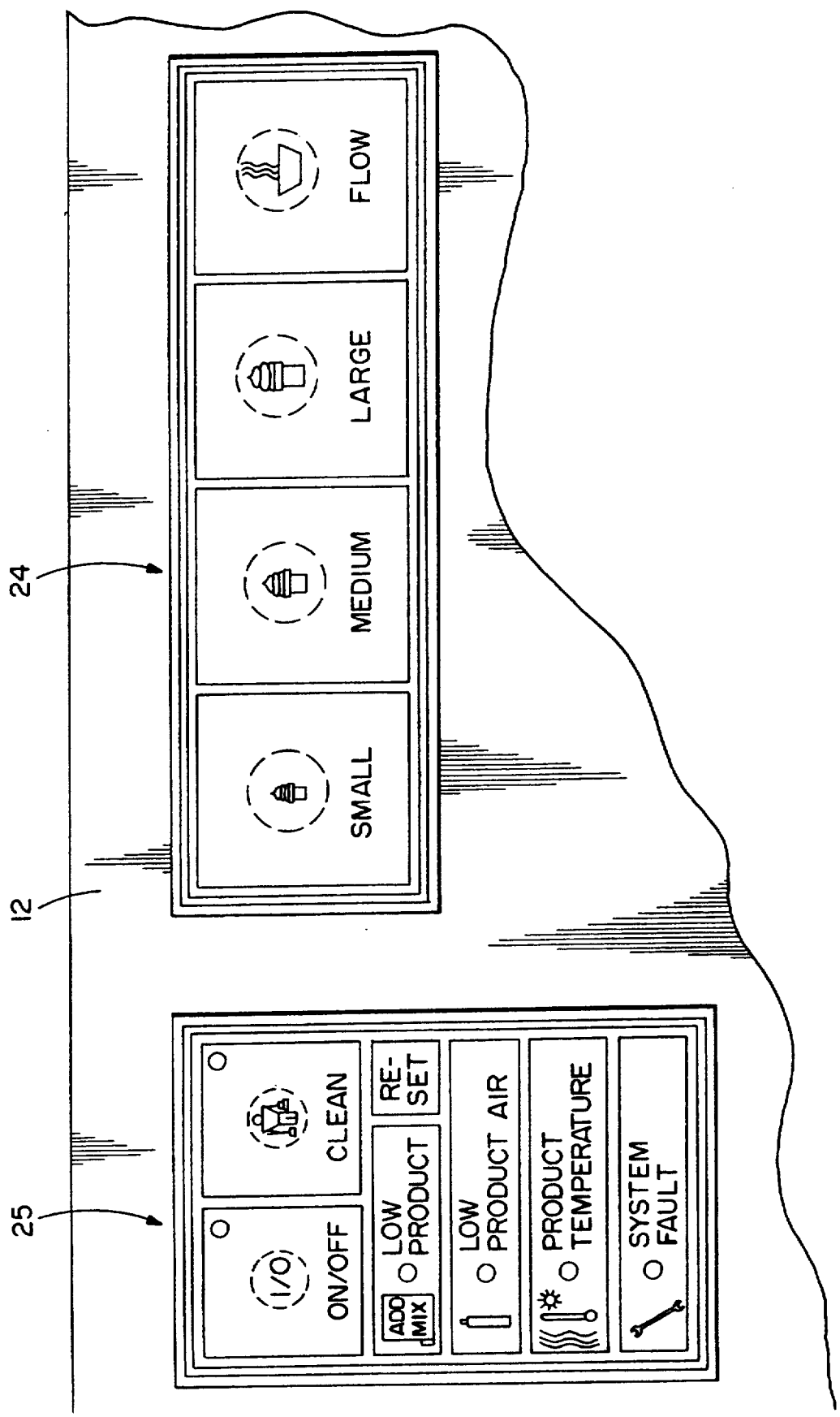

DISPENSER FOR SOFT-SERVE FROZEN DESSERT MACHINE

BACKGROUND OF THE INVENTION

The present invention relates to soft-serve frozen dessert machines. This invention is related to three other inventions for which applications are being filed concurrently, entitled "AERATOR FOR VISCOUS MATERIALS", "FREEZER WITH GROOVED HEAT EXCHANGE SURFACE", and "FREEZER WITH INNER CORE".

In the prior art, most soft-serve frozen dessert machines have a freezer which receives a liquid mix near the back of the freezing chamber and which dispenses soft-serve dessert at the front of the freezing chamber. The dispensers are manual, with the operator holding down a lever to fill up a cone or cup to a desired level. This gives the owner of the establishment very little control over portions. Portion control is desirable from two standpoints. First, it is desirable to provide a consistent product to the customer from one day to the next, so that the customer can know in advance what he will be getting when he orders a medium cone, for example. Second, portion control is important in controlling the profitability of the product. If the portions vary over a wide range depending upon who is operating the machine, then it is difficult for the store manager to set the price for each product, since he does not know what the cost of the product is.

SUMMARY OF THE INVENTION

The present invention provides portion control by providing an automated dispenser.

The present invention provides buttons which an operator pushes for certain portion sizes, and the automated controls then dispense a consistent amount of product each time a given button is pushed.

The present invention provides fluid-controlled dispensing valves for automatically dispensing the product.

The present invention provides a central controller which receives the signal of the button being pushed, which takes into account the viscosity of the product at any given time, and which controls the flow of fluid to the fluid-controlled dispensing valves.

The present invention provides a central controller which can be programmed by the machine operator to change the amount of product dispensed when any button is pushed, so that the machine is flexible.

Since the present invention has an automated dispenser and a central controller, it facilitates cleaning in place, so that the central controller can send cleaning fluid through the machine, opening and closing the dispensers, to run a cleaning cycle.

BRIEF DESCRIPTION OF THE DRAWINGS

FIG. 14 is a broken-away, enlarged view of a portion of the front of the machine of FIG. 1, showing the control buttons on the left side of the machine.

DESCRIPTION OF THE PREFERRED EMBODIMENT

Figure 1:
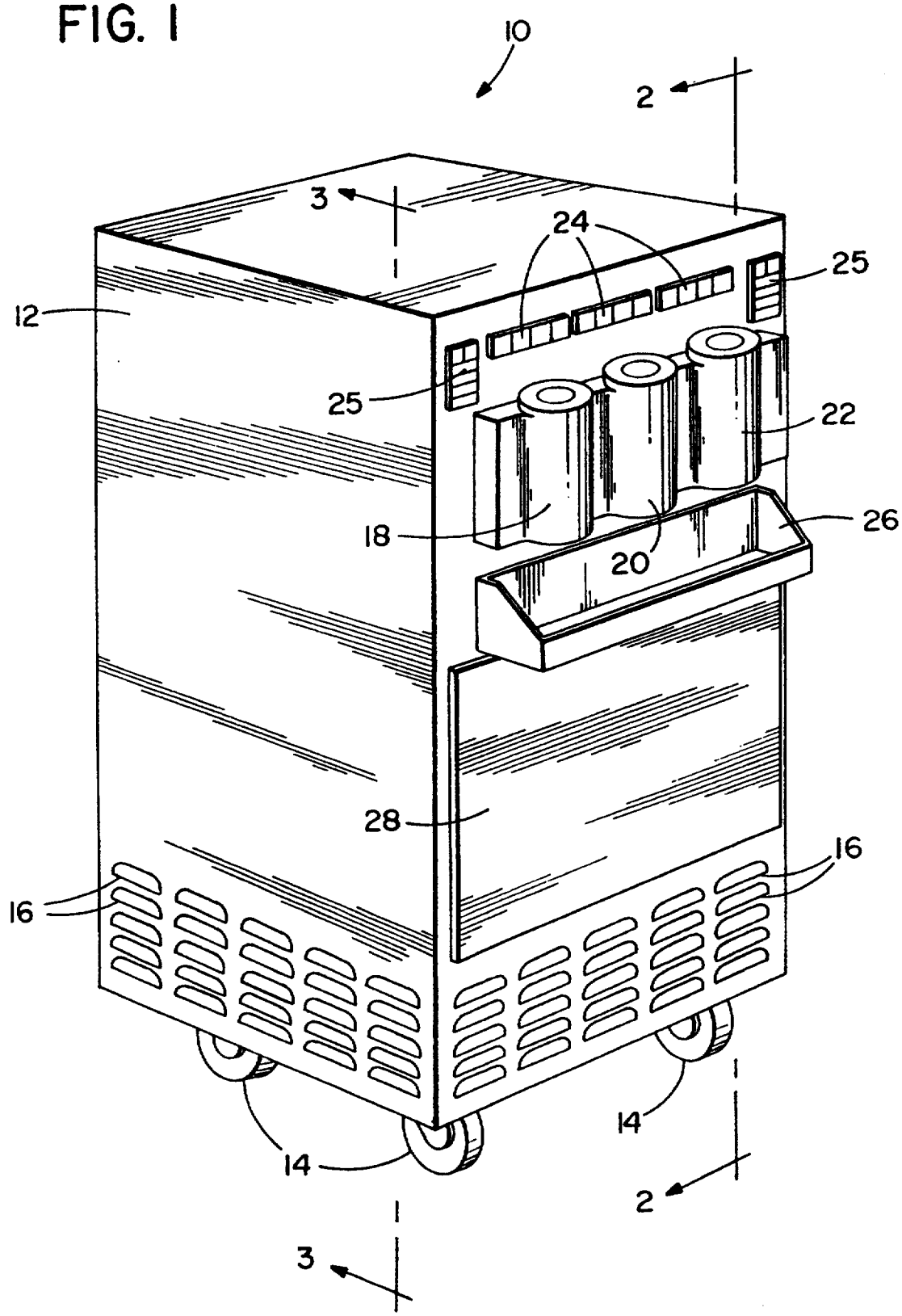
FIG. 1 is a perspective view showing the front of the frozen dessert machine of the present invention.

FIG. 1 shows the outside of the soft-serve frozen dessert machine 10, which includes an outer shell 12 and which rides on casters 14. Near the bottom of the shell 12 are vent openings 16, which permit air to flow through the bottom portion of the machine 10. In the front of the machine 10 are three dispensing nozzles 18, 20, 22. The nozzle 18 on the left dispenses frozen dessert from the left freezing chamber (shown in later figures), the nozzle 22 on the right dispenses frozen dessert from the right freezing chamber, and the nozzle 20 in the middle dispenses a mixture of the frozen desserts from both the left and right freezing chambers.

Above each dispenser 18, 20, 22 are four buttons 24 for selecting the various and adjustable portion sizes to be dispensed from each dispenser. One set of these buttons is shown more clearly in FIG. 14. There is also another set of buttons 25 on the left and right sides of the machine for controlling the operation of the machine for cleaning and maintenance. These buttons 25 are also shown more clearly in FIG. 14. Below the dispensers 18, 20, 22 is a tray 26, on which the machine operator can place cups, cones, or other containers for receiving the dessert from the dispensers. Below the tray 26 is a door 28, which opens into a refrigerated compartment, which will be described later. The lower portion of the refrigerator door 28 opens into an unrefrigerated compartment which houses bottled air (of course, any suitable bottled gas could be used), as will be described later. It should be noted that this machine 10 includes two soft-serve frozen dessert freezers, one on the left side and one on the right side, and the left and right sides of the machine are essentially mirror images of each other.

Figure 2:
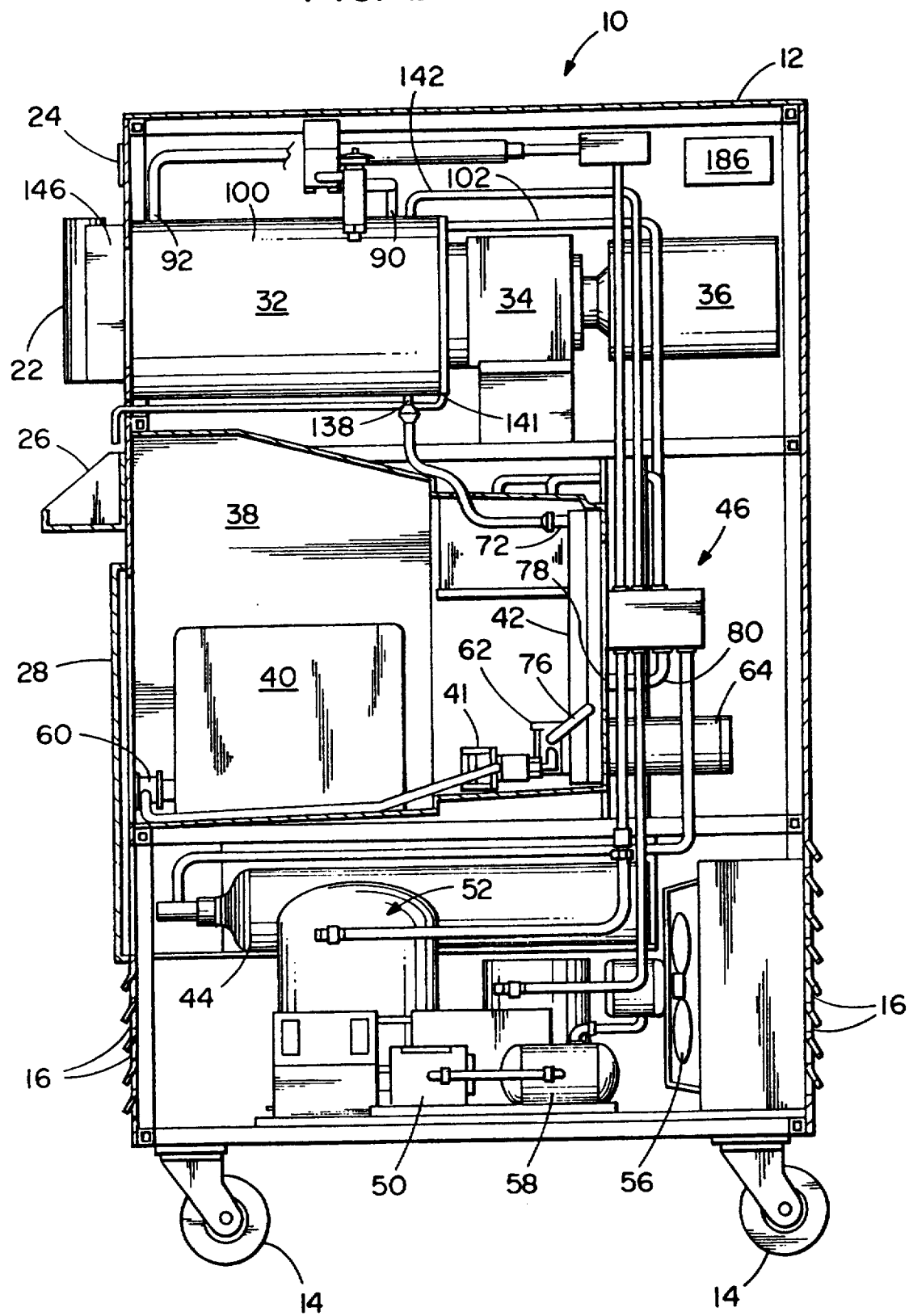
FIG. 2 is a schematic view taken along the section 2—2 of FIG. 1.
Figure 3:
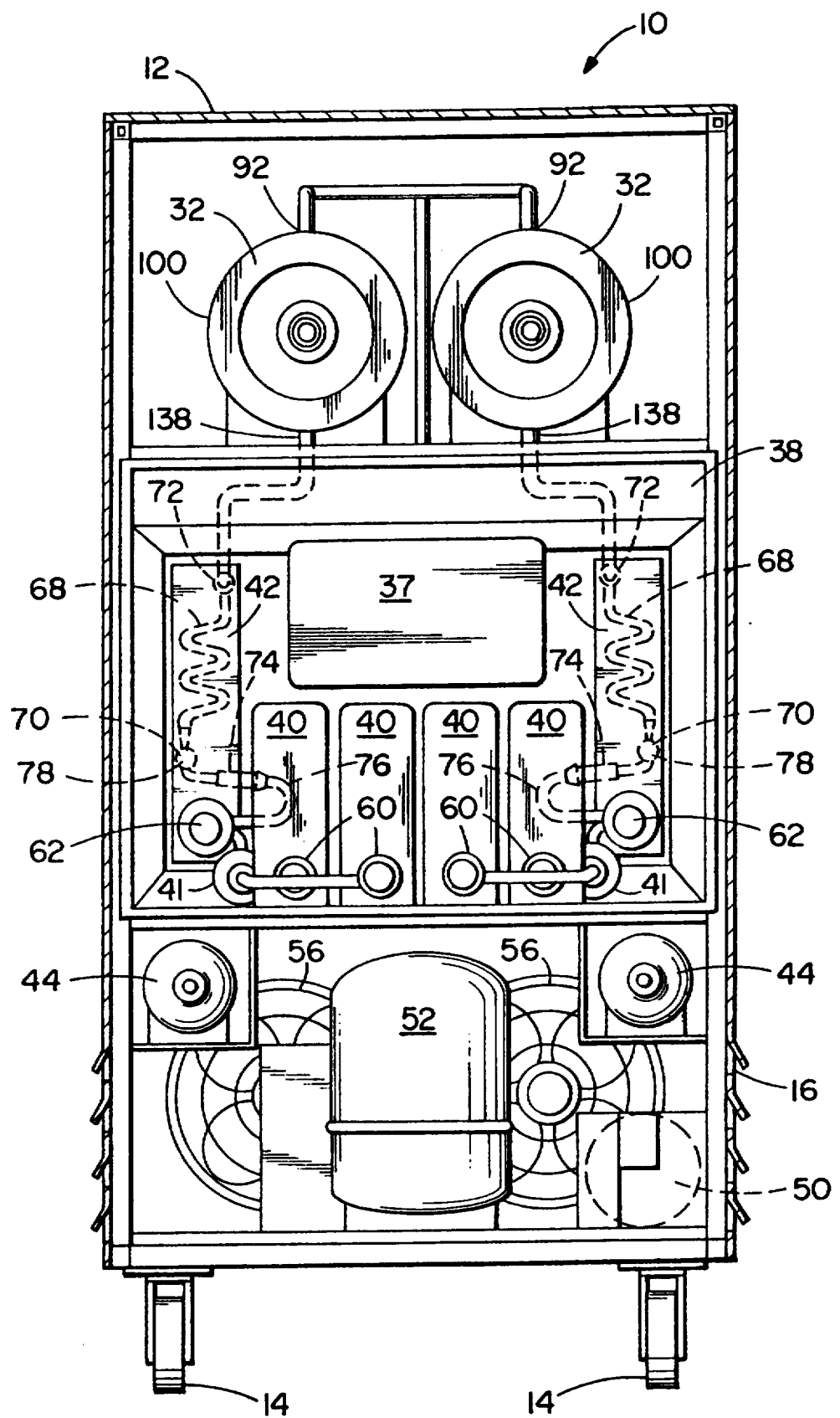
FIG. 3 is a schematic view taken along the section 3—3 of FIG. 1.
Figure 13:
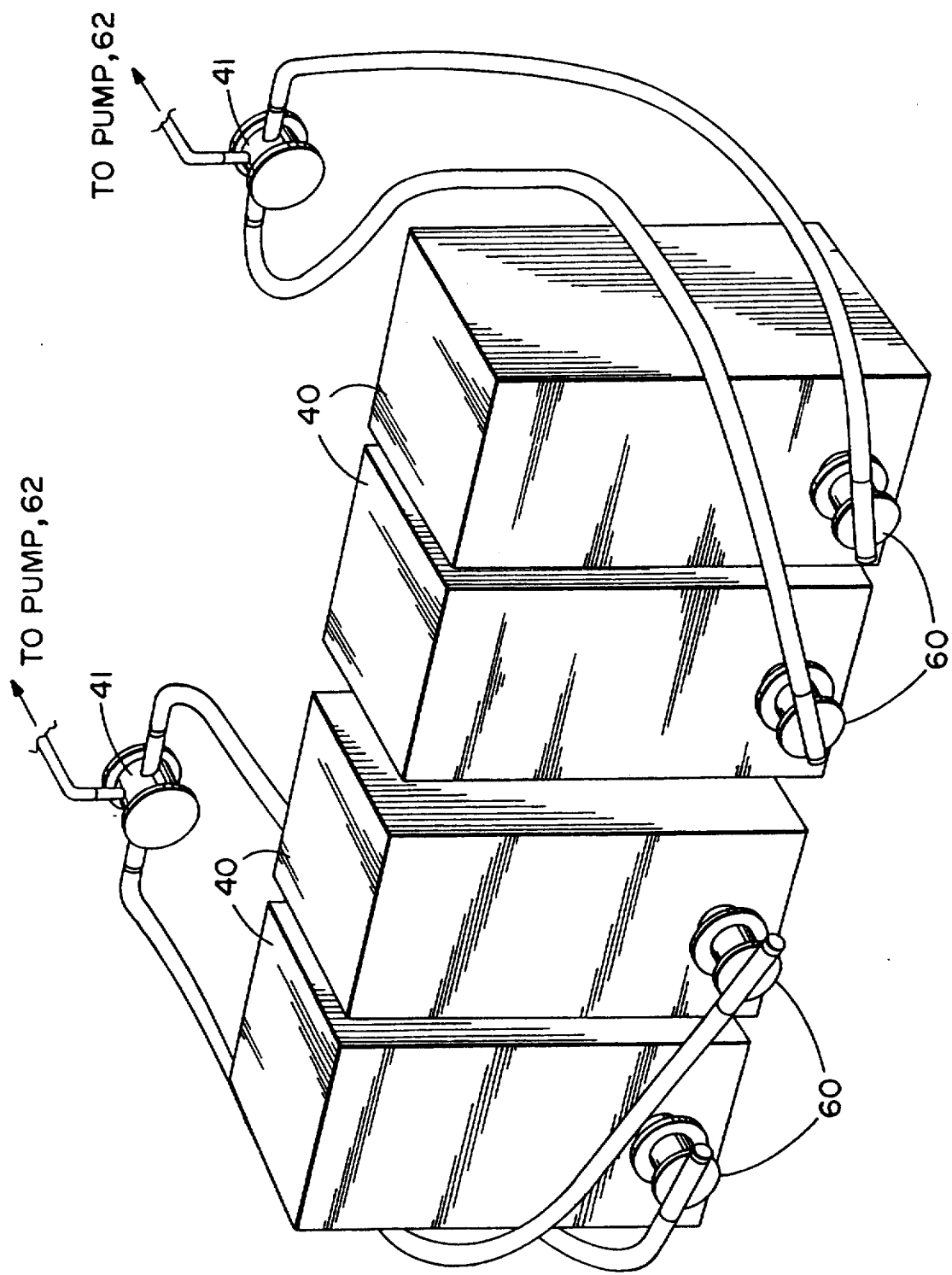
FIG. 13 is an enlarged perspective view of the boxes of liquid mix shown in FIG. 3.

Looking now at FIG. 2, again we can see the outer shell 12, the dispenser 22, the tray 26, the buttons 24, and the refrigerator door 28. We can also now see the inside of the machine 10. The major components are as follows:

Near the top of the machine 10 are two freezing chambers 32. In this view, we see the right freezing chamber 32, which is aligned with the right dispenser 22. Behind each freezing chamber 32 is a gear drive 34, which is driven by an electric motor 36. Below the two freezing chambers 32 is a single refrigerated chamber 38, which extends across the entire width of the machine 10 and lies directly behind the door 28, which was shown in FIG. 1. Inside the refrigerated chamber 38 is an evaporator 37 through which coolant passes to cool the refrigerated chamber 38. A plurality of boxes 40 of liquid frozen dessert mix are located in the refrigerated chamber 38. When the frozen dessert mix is aerated and chilled, it will become the final frozen dessert product. This is best seen in FIGS. 3 and 13, illustrating the use of four boxes 40. The two boxes on the left feed the left freezer, and the two boxes on the right feed the right freezer. There is a switching valve 41 for each pair of boxes 40. The switching valves 41 sense when a vacuum is being pulled in a box 40, indicating that the box is empty, and then automatically switch over to the other box 40, at the same time turning on the "Add Mix/Low Product" light on the control panel 25. When the operator replaces the empty box 40, the operator also pushes the "Reset" button to turn off that light. In the back portion of the refrigerated chamber 38 are two mixing chambers 42, where the liquid mix 40 is mixed with air (or other gas), as will be described in detail later. Below the refrigerated chamber are two bottles 44 of medical-grade bottled gas. Both freezers 32 operate off of a single bottle of gas 44 at any given time, and a light on the control panel 25 indicates when the pressure in the bottle 44 is low so that an operator must switch the machine over to the other bottle 44, put in a fresh bottle 44 which is pressure controlled and which automatically resets the light on the control panel 25, thereby permitting continuous operation. We can see the right bottle 44 in FIG. 2. Behind the refrigerated chamber 38 are a number of solenoid valves 46, which control the flow of fluids in the machine 10. Below the refrigerated chamber 38 are two compressors. The large compressor 52 runs the refrigeration unit, which provides refrigerant to the freezers 32 and to the refrigerated chamber 38. The small compressor 50 compresses ambient air and provides it as a working fluid to drive the air-actuated dispensers 18, 20, 22.

There are several different fluid systems within the machine 10:

THE FROZEN DESSERT SYSTEM

First, there is the frozen dessert system, which begins as a liquid in its respective mix box 40. Each box 40 is connected to an aseptic connector and valve 60, which connects by an individual tube to a switching valve 41. The liquid mix passes through the aseptic valving 41, 60 and the corresponding tubing. It is then pumped by its respective pump 62, which is driven by its respective motor 64. It is then aerated in its respective mixing chamber 42, as will be described in more detail later. Next, it is frozen in its respective freezer 32. Finally it is dispensed through its respective dispenser 18, 20, or 22. Any part of the machine which comes in contact with the frozen dessert system is food grade material. The seals which contact the frozen dessert system are food grade seals, and every part of the machine which comes into contact with the frozen dessert system is free of cracks or crevices where bacteria could grow and is designed to be cleaned in place. All parts of the machine which contact the frozen dessert from the pump 62 up to the freezer 32 are sloped toward the pump 62 to facilitate cleaning in place.

THE PURE GAS SYSTEM

Second, there is the pure gas system. The pure gas is a dry, filtered, food grade gas, free of bacteria and other pathogens. The pure air (or other suitable gas) begins in the bottles 44, passes through a pressure regulator 45 and a flow meter with a needle valve 47, then through some of the solenoid valves 46, which direct it to the mixing chambers 42, where it is used to aerate the frozen dessert mix in the mixing chambers 42. The solenoid valves 46, controlled by the central processor 186, open the flow of pure gas to the mixing chamber 42 when the pump 62 is running and close off the flow of gas to the mixing chamber 42 when the pump 62 is off. The mixed pure gas/frozen dessert mix is chilled in the respective freezers 32, and is dispensed out of the freezers 32 through the dispensers 18, 20, or 22. The solenoid valves are constructed of food grade material with bubble tight sealing. In addition, all piping and fittings which come into contact with the pure gas are food grade material.

THE REFRIGERANT SYSTEM

Third, there is a refrigerant loop which is used to chill the freezers 32 and the refrigerated chamber 38. The refrigerant also is used to prevent the product from freezing at the inlet of the freezer 32, to avoid plugging of product inlet, as will be described later. In the preferred embodiment, the refrigerant is HP62. Beginning at the compressor/condenser unit 52, the warm liquid refrigerant flows to the thawing chambers surrounding the product inlets of the freezers 32 (which will be described later), and then, as is well-known in the refrigerant industry, through a filter/drier (not shown), through one of the solenoid valves 46, and through an expansion valve (not shown). When the pressure of the refrigerant is reduced as it passes through the expansion valve, the refrigerant temperature drops. The refrigerant then goes through the evaporators of the freezers 32 and of the refrigerated chamber 38, passes through a heat exchanger to vaporize any remaining liquid refrigerant, and then goes back to the compressor/condenser 52 to begin the cycle again. As best seen in FIG. 3, fans 56 are located adjacent to the large compressor 52 to exhaust hot air from the compressor/condenser 52 and to bring in cool air.

THE CONTROL AIR SYSTEM

Fourth, there is a control air system, in which ambient air is compressed by the small compressor 50, is stored in the small air tank 58, and passes through the solenoid valves 46, which control and direct the control air flow to the dispensers 18, 20, 22. The solenoid valves 46, which control the flow of working fluid to the dispensers, determine when and for how long the dispenser valves will open. The solenoid valves 46 are controlled by the central processor, which will be described in more detail later.

Referring again to FIG. 3, we can see the left and right freezers 32 at the top of the machine 10. Below them is the refrigerated chamber 38, which holds four boxes of liquid mix 40 and two mixing chambers 42, which lie at the back of the refrigerated chamber 38. Below the refrigerated chamber 38 are the left and right bottles of pure bottled gas 44. Below the bottles of pure gas 44 are the compressor/condenser 52, the fans 56, and the small compressor 50 for providing the control air.

Figure 4:
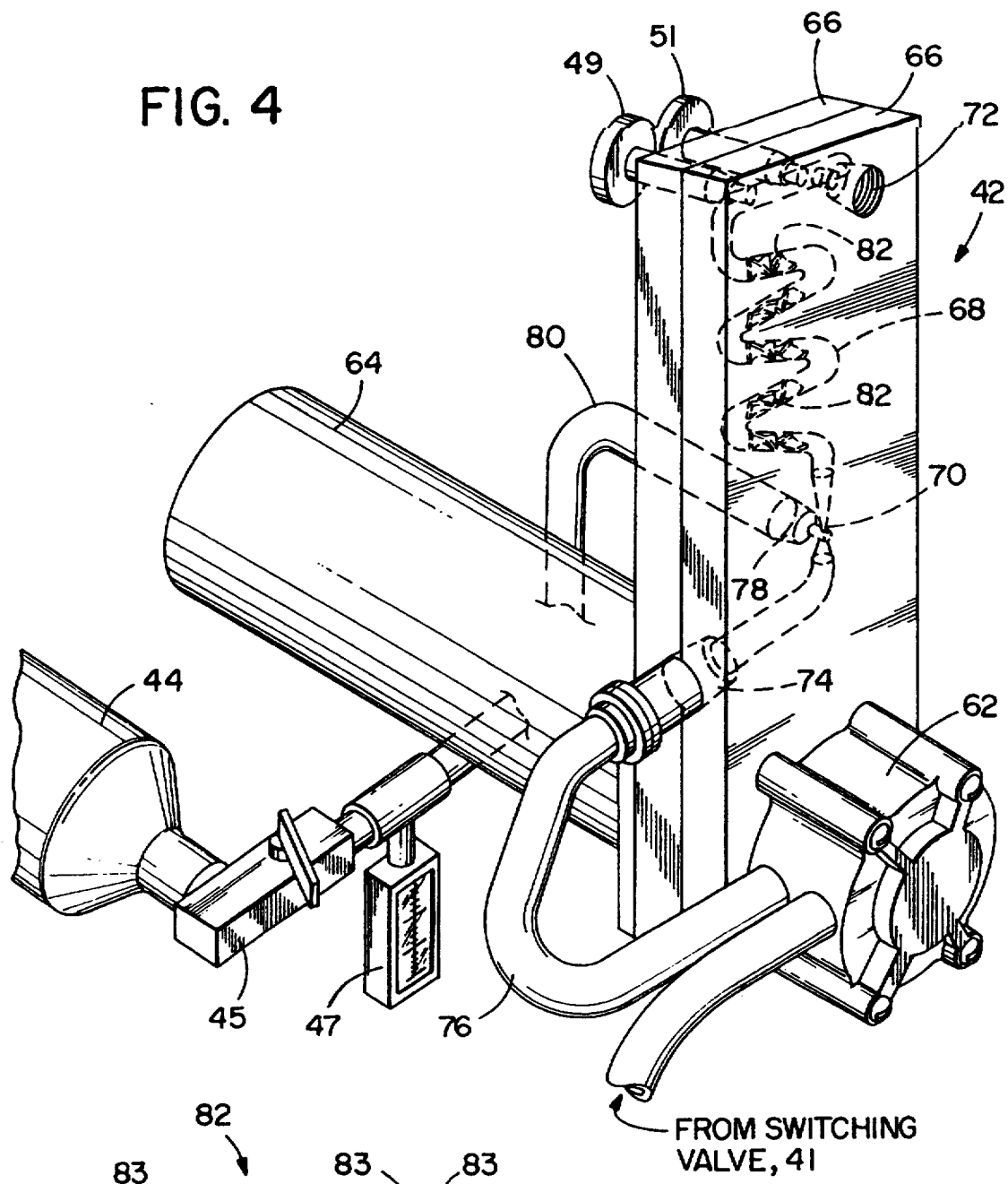
FIG. 4 is a perspective view of the mixing chamber of the machine of FIG. 1.
Figure 5:
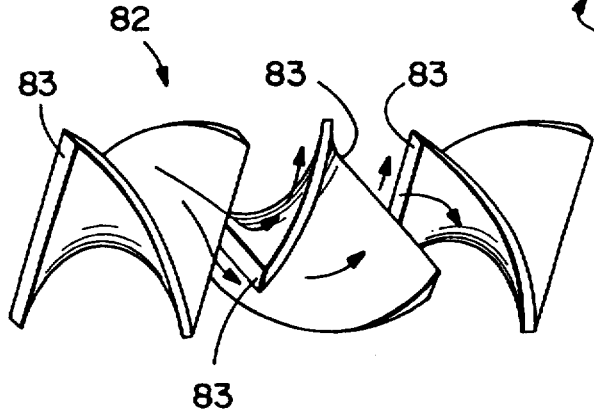
FIG. 5 is an enlarged perspective view of some of the spiral blades of the mixing chamber of FIG. 4.

FIG. 4 shows one of the mixing chambers 42 in more detail. The mixing chamber 42 is where the gas and liquid are mixed together before entering the freezer. The mixing chamber 42 is preferably made out of two pieces of molded plastic 66, which, when bonded together, form a tube 68. The tube 68 is designed so that it is always inclined downward, toward the pump 62 mounted at the bottom of the mixing chamber 42. The mixing chamber 42 is made with no crevices or areas to trap product, so that it can be cleaned in place. The tube 68 has a small-diameter portion 70, near the bottom. At the top of the tube 68 is an internally-threaded opening 72, which permits the mixing chamber tube 68 to be connected to additional tubing to transport the frozen dessert mix to the freezer 32. At the bottom of the mixing chamber tube 68 is another internally-threaded opening 74, which permits the mixing chamber tube 68 to be connected to additional tubing 76 coming from the pump 62. At the small diameter portion 70, is a gas inlet opening 78 in the back of the mixing chamber, which is also internally threaded and which receives the pressurized pure gas from one of the gas bottles 44 through the tube 80. Inside the mixing chamber tube 68 are mixing blades 82. The mixing blades 82 are stationary spiral blades which are set at right angles to each other, as shown in FIG. 5, so that liquid travelling along the path defined by the surface of one blade will be cut by the next blade as the liquid flows past the mixing blades 82 through the mixing chamber tube 68. Thus, the mixing blades 82, which are stationary in the mixing chamber tube 68, provide a plurality of cutting edges 83, causing the gas bubbles to break up into very tiny bubbles. The mixing blades 82 are installed by pressing them between the two halves 66 of the mixing chamber when the halves are bonded together.

The mixing chamber is constructed so as to minimize the occurrence of crevices, cracks, porosity or small internal radii which could harbor bacteria, and to facilitate in-place cleaning. All passages in the mixing chamber slope back toward the pump 62, so that any liquid can be drained during the cleaning process.

Sensors 49, 51 are located at the back of the mixing chamber near the top to sense the pressure of the liquid/gas mixture as it leaves the mixing chamber. These sensors indicate when to turn the pump 62 on and off to maintain the pressure of the mix in the system. They also indicate when the pressure is much too low (i.e. due to a broken line) and cause the system to shut down in that event, turning on the "System Fault" light on the control panel 25 in the process.

Looking now at the flow of fluids in the mixing chamber 42, as the liquid dessert mix is pumped into the bottom opening 74 of the mixing chamber 42, it enters a venturi section or small-diameter portion 70 of the mixing tube 68, the geometry of which imparts a high velocity to the mix. At the small-diameter portion 70, the pressurized pure gas is also introduced through the opening 78. The gas and liquid then mix together in the static mixer, which is made up of the mixing chamber tube 68 with mixing blades 82 inside the tube. The mixing blades 82, confined by the mixing chamber tube 68, form a tortuous path and a plurality of cutting edges which break up the gas into tiny bubbles. The tortuous path is not the zig-zag path of the mixing chamber tube 68 but rather the path the liquid inside the tube 68 must take in order to get past the blades 82. The purpose of the zig-zag path of the tube 68 is simply to get a long stretch of tube in a short vertical distance—not to cause the gas and liquid to mix. The amount of gas put into the mix is controlled by controlling the speed of the pump 62 which pumps the liquid mix and by controlling the pressure and flow rate of the gas coming from the bottle 44. The pressure and flow rate of the gas are controlled by the pressure regulator 45 on the bottle 44 and by the adjustable needle valve 47 in the gas line between the bottle 44 and the mixing chamber 42. Also, one of the solenoid valves 46 turns the gas flow on and off. When the gas/liquid mixture leaves the mixing chamber 42 through the outlet 72, the air and liquid are very well-mixed. This reduces the need for mixing of the gas and liquid in the freezer 32. In tests which have been conducted on this equipment, it has been found that the average bubble size of the mixture coming out of the mixing chamber is under 100 microns in diameter.

Figure 6:
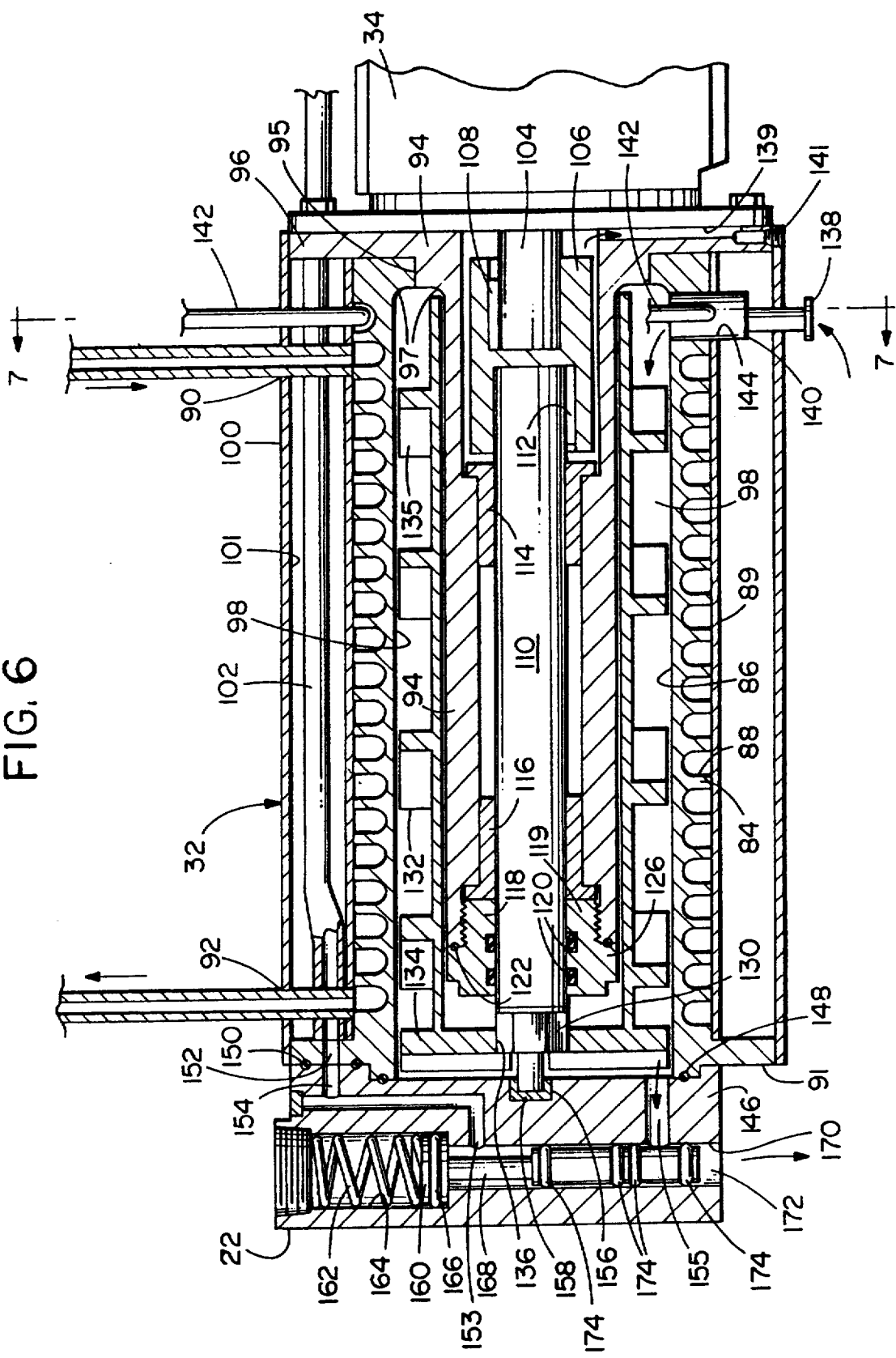
FIG. 6 is a right side sectional view of the freezing chamber of FIG. 2.

FIG. 6 shows the freezer 32 in more detail. The freezer 32 is made up of a member 84, which has a substantially cylindrical inner surface 86 and a spiral groove in its outer surface 88. The member 84 is preferably cast, although it could be machined or made by other known methods. A tube 89 is shrunk over the outer surface 88 of the member 84 to create a spiral passageway for the refrigerant. This is accomplished by first heating the tube 89 so that it expands and then slipping the expanded tube over the member 84 from back to front until it reaches the front flange 91 of the casting 84. Then, when the tube 89 cools, it shrinks around the casting 84 so that the refrigerant cannot slip through any space between the tube 89 and the casting 84 and must follow the spiral path 88.

The assembled member 84 containing the spiral groove 88 together with the outer tube 89 are then heated so that they expand, and then they are slipped over the inner core 94 until they abut the rear flange 96 of the inner core. There is an annular area 95 in which the member 84 has an interference fit with the inner core 94. The diameter of the inner core in that annular area 95 is actually 0.003 inches larger than the diameter of the member 84 in that annular area when the member 84 and the inner core 94 are at the same temperature, before the member 84 is heated and slipped over the inner core 94. When the member 84 and the inner core 94 cool off again, they are rigidly connected together with an interference fit, and there is no gap left between them to trap product. There are radiused corners 97 on the member 84 and the core 94 just forward of the annular joint 95, again avoiding square corners or any place which could trap product.

The refrigerant enters the freezer 32 at the refrigerant inlet 90, at the back of the freezer 32, passes through the spiral passageway 88, and leaves through the refrigerant outlet 92, near the front of the freezer 32. This arrangement minimizes the expense in making the freezer and provides for good heat transfer from the refrigerant to the product (avoiding problems of gaps between the coil which holds the refrigerant and the body of the freezer which are common in prior art designs), thereby improving the efficiency of the present evaporator over prior art evaporators. (It may be desirable to make the casting 84 out of a material which transfers heat well, which may not be a food-grade material, and to line the casting 84 with a food-grade material.)

The inner core 94 includes a rear flange 96, which abuts the rear wall of the member 84 and closes the back end of the freezer 32. The inner core 94 projects forward inside the member 84 almost to the front end of the freezer 32, creating a product chamber 98 in the space between the inner core 94 and the casting 84. The product chamber 98 has a doughnut-shaped cross-section (shown best in FIG. 7).

An outer tube 100 is fitted around the outside of the freezer 32, enclosing the rear flange 96 and the front flange 91 (the front flange 91 being part of the casting 84), and forming an air space 101. The control air line 102 extends through that air space 101 and projects out through the front flange 91 to bring pressurized air to the right dispenser 22, for controlling that dispenser, as will be described later. Two control air lines also extend through the front flange 91 of the left freezer 32 for controlling the left and center dispenser 18, 20.

Behind each freezer 32 is a gear box 34, which has a drive shaft 104 that projects inside the inner core 94 of the freezer 32 and is enclosed by the inner core 94. The drive shaft 104 is keyed to a coupling 106 at a first keyway 108, and the coupling 106 is then keyed to a second drive shaft 110 at a second keyway 112, so that, as the motor 36 drives the drive shaft 104, it causes the second driveshaft 110 to rotate. The second shaft 110 extends through rear and front bushings 114, 116, which are press fit into the inner surface of the inner core 94. Thus, the drive shafts 104, 110 collectively extend through the entire length of the inner core 94.

At the front end of the inner core 94 is a seal 118, which includes a substantially toroidal body 119 that includes two Oring seals 120 on its inner surface that seal against the second shaft 110 and one O-ring seal 122 or a sanitary seal/gasket on its back surface which is pressed between the seal flange 126 and the front face of the inner core 94 as the seal 118 is threaded onto the inner core 94. Unlike prior art designs, in which the seal between the drive shaft and the freezer is located at the back of the freezer, this seal 126, located at the front of the freezer 32, is easy to remove and replace. To remove the seal 126, the face plate 146 on the front of the freezer 32 must be removed, the dasher 132 is pulled out the front of the freezer 32, and then the seal 126 is rotated to unthread it from the core 94 and is removed out the front of the machine. Once the seal 126 is removed, the second drive shaft 110 can then be pulled out the front of the freezer 32 to clean out the inside of the core 94.

In prior art machines, if the seal at the back of the freezer leaks, the product goes out of the freezer into the back of the machine, where it can accumulate. In this machine, if the seal 126 leaks, it will let product into the inside of the core 94. The product will follow the driveshafts 110, 104 back to the back of the inner core 94 and will pass down through a gap 139 in the back of the freezer 32 which communicates with the bottom of the inside of the core 94 and with an outlet opening 141 which is connected to a tube (shown in FIG. 2) running to the front of the machine, so that a leak would quickly be seen by the machine operator as it drips onto the tray 26 at the front of the machine.

Having detected a leak, the machine operator would then run a clean-in-place cycle (which will be described later) to clean the product out of the freezer, open up the face plate 146, remove the dasher 132, the seal 126, and the second shaft 110, would clean out the inside of the core 94 and the drip tube running to the front of the machine, would replace the second shaft 110, put in a new seal 126, replace the dasher 132 and the face plate 146, and the freezer 32 would then be ready to run again, with the leak having been promptly repaired.

The front-most portion 130 of the second shaft 110 has a hexagonal cross-section. The dasher 132 includes a front plate 134 with a hexagonal cross-section hole 136 in its center, which fits onto the hexagonal end 130 of the second shaft 110 so that the dasher 132 can be driven by the motor 36. The rest of the dasher projects back into the product chamber 98 to scrape the product which sticks to the cylindrical surface 86 of the casting 84 as the liquid mix freezes and to mix the product and move the product forward toward the dispensers. The dasher 132 is shown in more detail in FIG. 8.

The dasher 132 has a very different shape from prior art dashers, because it has to have an opening at one end which leads to a hollow center portion that fits over the core 94 of the freezer 32. In the present invention, because of the small bubble size of the aerated liquid entering the freezer 32, the dasher 132 does not have to do as much mixing and can operate at a much slower speed than do the dashers of the prior art. The dasher of the present invention preferably rotates in the range of 25-50 rpm (most preferably about 35 rpm), as compared with speeds of 100 rpm or greater in the prior art. This saves energy, because it requires less work to rotate the dasher at a slower speed.

There is a product inlet 138 at the bottom and back of the freezer 32, which permits the aerated liquid mix to enter the back of the product chamber 98. In order to avoid the problem of the product inlet 138 freezing up and plugging, there is an inlet heater 140 surrounding the inlet 138. As is shown in more detail in FIG. 7, the inlet heater 140 includes a tube 142 which carries refrigerant to a chamber 144, which surrounds the product inlet 138. The refrigerant which goes through the tube 142 and the chamber 144 is at the point in the refrigeration cycle before it has been expanded, causing its temperature to drop. It is not so warm that it would warm up the product as it enters the freezer 32, but it is warm enough to prevent the product from freezing up at the inlet and plugging the inlet. As the product moves from the inlet 138 at the back of the freezer 32 toward the front of the freezer 32, the product is frozen. The dasher 132 scrapes the product off of the inner surface 86 of the casting 84 and propels the product toward the front of the freezer 32. The product inside the freezer 32 is under pressure, due to the pump 62, so that, when a dispenser opens, the product will automatically move to the low pressure outside the dispenser.

Figure 9:
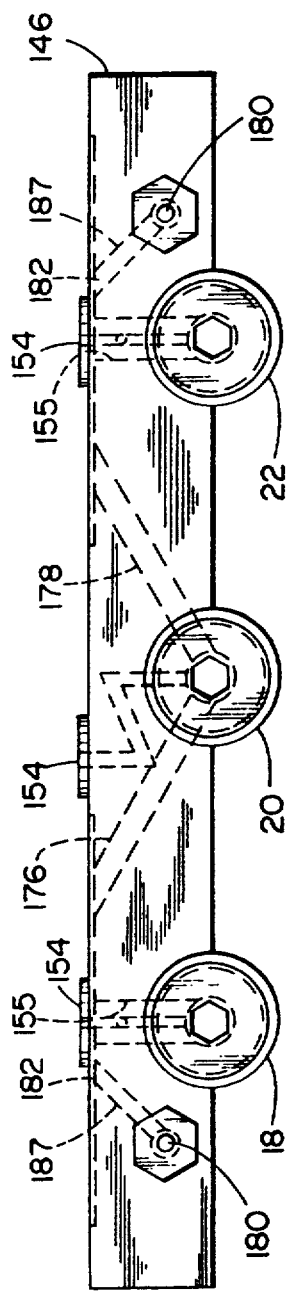
FIG. 9 is a top view of the dispenser portion of the machine of FIG. 1.
Figure 10:
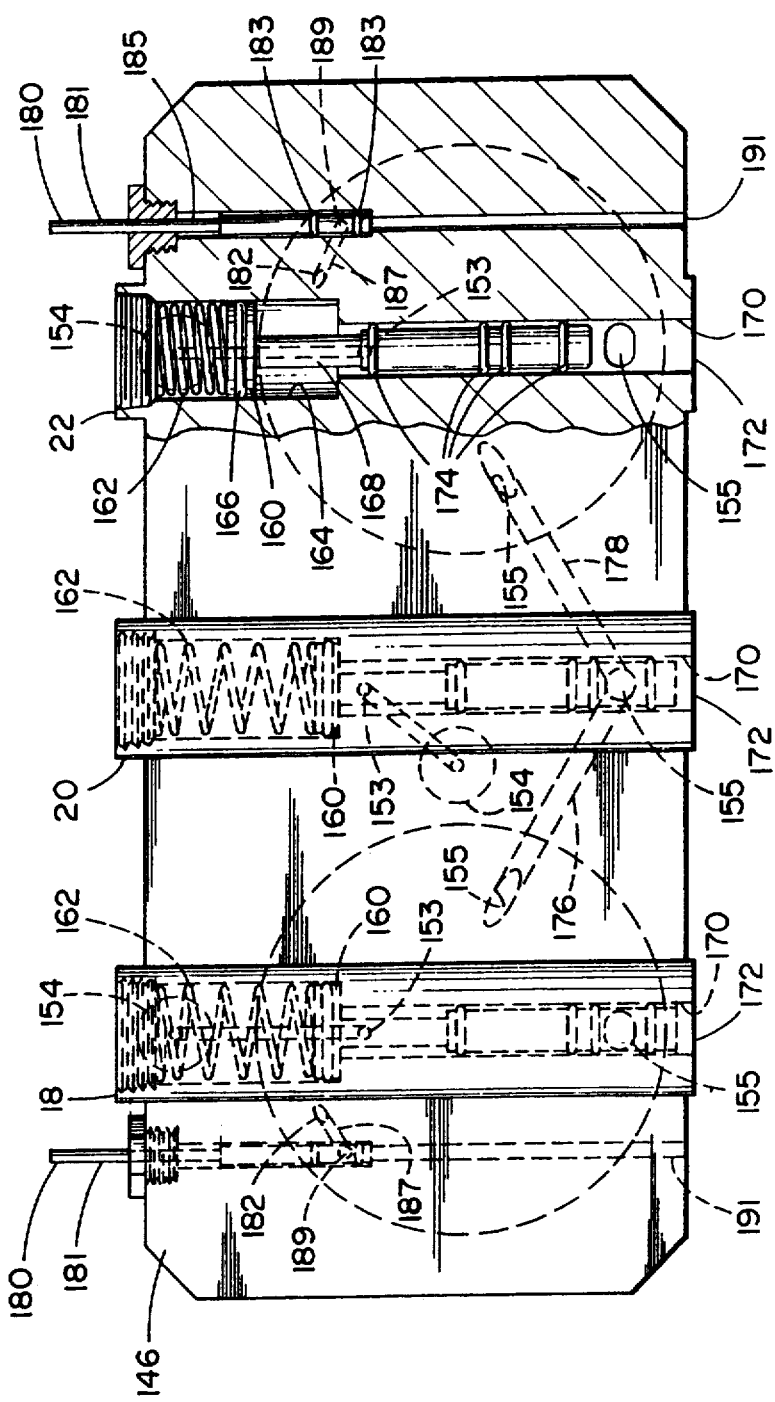
FIG. 10 is a front view of the dispenser portion of the machine of FIG. 1 partially in section.

As shown in FIG. 6, at the front of the freezer 32 is a face plate 146 which is bolted to the front of the casting 84 and is sealed against the front face of the casting 84 by means of O-ring seals 148 and 150 or sanitary seals/gaskets. The large O-ring 148 seals around the product chamber 98, and the small O-ring 150 seals around the control air opening 152, which brings the control air to the dispenser. The control air enters the dispenser chamber at the opening 153. As shown in FIG. 9, the face plate 146 has nine openings toward the casting 84—three top openings 154 for receiving pressurized air to control the three dispensers, four bottom openings 155 for letting frozen dessert into the dispensers (one bottom opening for each of the left and right dispensers 18, 22 and two bottom openings for the center dispenser 20, which dispenses from both freezers 32), and two openings 182 leading from the top of the two product chambers 98 to the vent lines 187, for venting air out of the freezers 32 as they are initially filled with product or with cleaning fluid. One of the top openings and one of the bottom openings are shown in FIG. 6. The top opening 154 is aligned with the control air opening 152 in the casting 84, and the bottom opening 155 opens into the bottom of the product chamber 98 so as to receive product from the freezer 32. The other openings are shown in FIGS. 9 and 10, which will be discussed later. There is a bore 156 in the face plate 146, which receives a bushing 158 that supports the end of the second shaft 110 so the shaft 110 does not float axially as it rotates.

FIG. 6 shows the right dispenser 22. The left and center dispensers 18, 20 are identical to the right dispenser 22, except that the center dispenser 20 receives product from both freezers 32. The dispenser 22 includes a plunger 160, which is biased downward by means of a helical spring 162. The helical spring 162 lies in the plunger chamber 164 and abuts the top surface of the plunger 160. The plunger 160 is sealed against the cylindrical inner wall of the plunger chamber 164 by means of an O-ring 166 and is attached to a plunger shaft 168, which extends down into a smaller diameter dispenser tube 170, which terminates at the dispenser opening 172, where the product leaves the machine 10. The plunger shaft 168 is sealed against the smaller diameter dispenser tube 170 by means of O-rings 174.

When the plunger 160 is in the resting position, biased downward by the spring 162, the O-rings 174 on the plunger shaft 168 which are positioned above and below the bottom opening 155, prevent the product from leaving the freezer 32. When a button 24 is pushed, telling the central processor that the operator wants to dispense frozen dessert from that dispenser, control air from the control air system enters through aligned openings 152 and 154 into the upper portion of the dispersing tube 170 and pushes against the bottom surface of the plunger 160, causing the plunger 160 to move up until the plunger shaft 168 and O-rings 174 lie above the product opening 155. This allows product to flow out of the freezer 32, into the dispenser tube 170, and out of the machine 10 through the dispenser opening 172. When one of the solenoid valves 46 vents the control air, air pressure is removed from the plunger 160. The dispenser valve 22 then closes again due to the biasing action of the spring 162, so that no more product is dispensed. The product sits in the product chamber 98 of the freezer until the machine operator again pushes a button 24, sending a signal to the central controller to send control air to the dispenser valve again. The motor 36 continues to run, whether or not product is being dispensed, but the flow of refrigerant to the freezer 38 is turned on and off based on the viscosity of the product in the freezer (which is measured by measuring the amperage drawn by the motor 64). The pump 62 is turned on as necessary to maintain the product pressure, sensed by the sensor 49, as was explained earlier. The control of the dispensers will be described in more detail in the description of FIG. 11.

Figure 7:
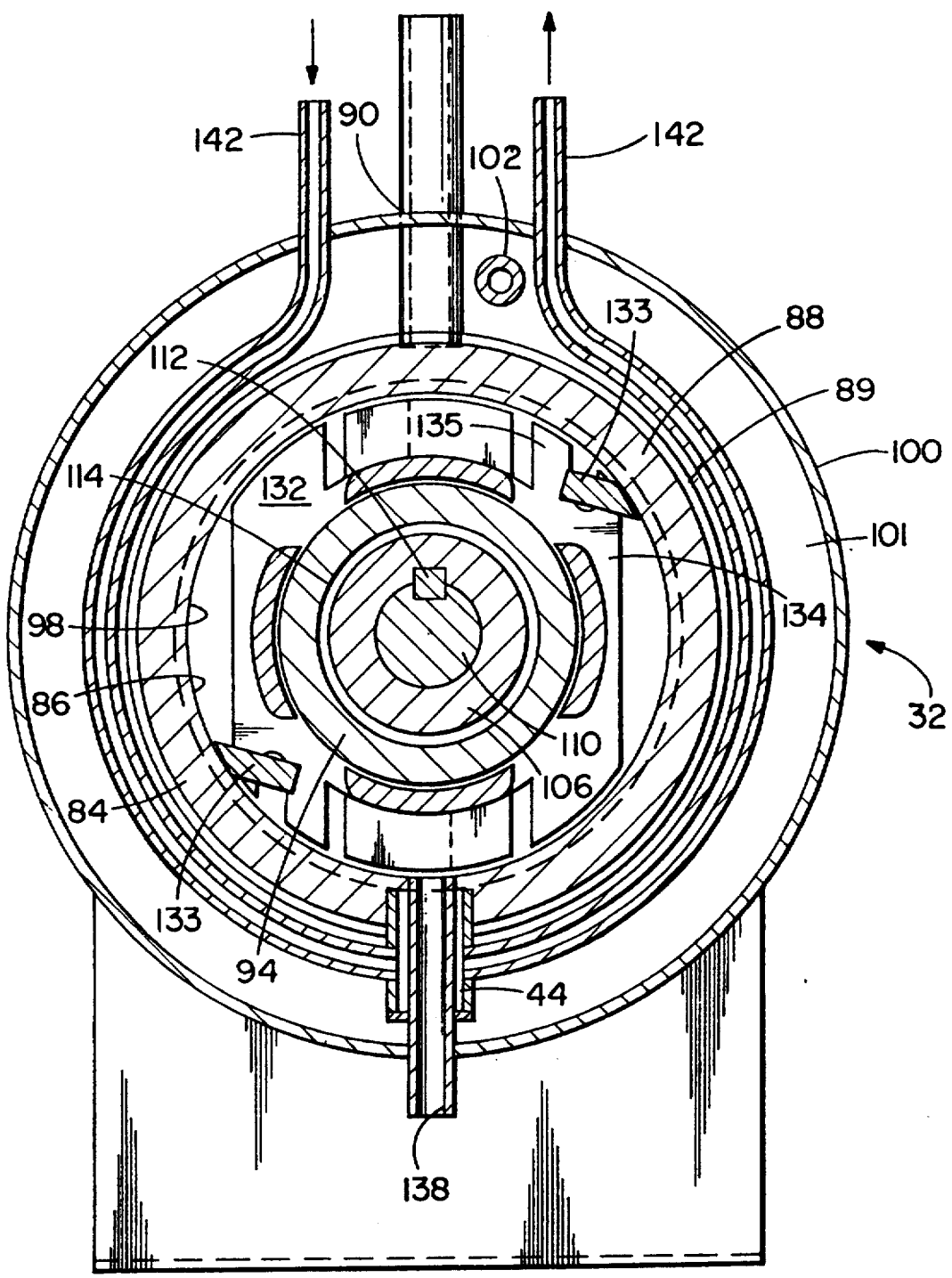
FIG. 7 is a view taken along the section 7—7 of FIG. 6.
Figure 8:
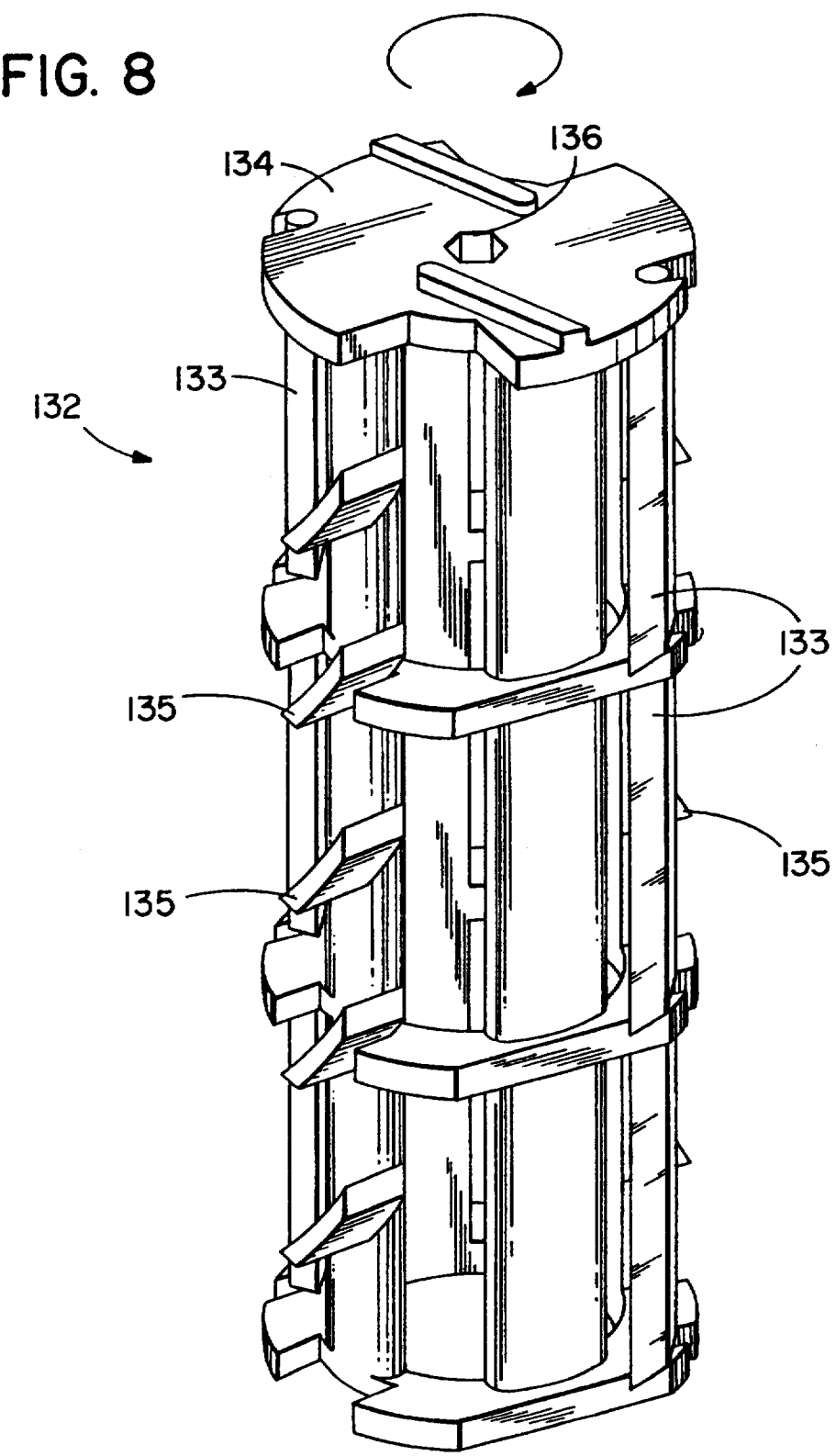
FIG. 8 is a perspective view of the dasher portion of the freezer of FIG. 6.

FIGS. 7 and 8 show the dasher 132, including scraper blades 133, which scrape frozen dessert off of the wall 86 of the freezer 32, and angled blades 135, which mix the frozen dessert and propel it toward the front of the freezer 32.

FIGS. 9 and 10 show the dispensers 18, 20, 22 and the associated flow paths, inlets and outlets. The left and right dispensers 18, 22 function as described above. The center dispenser 20 functions in essentially the same way, except that it receives frozen dessert from both the left and right freezers 32 along the paths 176, 178. The control air line which controls the center dispenser 20 runs in the air space 101 of the left freezer 32.

It should also be noted that there is an additional plunger 180 associated with each of the left and right dispensers 18, 22 (not with the center dispenser 20). These additional plungers 180 are manually controlled and are for the purpose of purging air from the freezers 32 when the freezers are initially filled with mix or when the freezers are cleaned in place (whenever it is necessary to purge air or gas from the freezer 32 in order to fill it with liquid). The plungers 180 each have a stem 181, provided with a pair of spaced O-rings 183 abutting the wall of the plunger chamber 185. Each plunger chamber 185 includes an opening 189 to a passageway 187, which leads to the top of the product chamber 98 of the respective freezer 32. When a plunger 180 is in the resting position, its O-rings 183 lie above and below that opening 189, closing it off. When a plunger 180 is manually lifted up, the O-rings 183 lie above the opening 189, permitting air or other fluid from the product chamber 98 to be vented out the bottom opening 191 of the plunger chamber 185.

Unlike other soft-serve frozen dessert machines, which must be taken completely apart, the pieces washed, and then reassembled every day, the machine of the present invention can be cleaned in place because it does not have cracks or crevices that can harbor stagnant product. In order to clean the machine 10 in place, the following procedure is followed.

CLEAN-IN-PLACE PROCEDURE

First, the person operating the machine pushes the off button, which is one of the buttons on the panel 25. This turns off the system, including the refrigeration unit and the pump 62. To keep from damaging the dasher due to highly viscous product, the dasher remains on and is turned off only after the first clean cycle has been completed. Then, the person disconnects the product boxes 40 from their valving 60, and connects the valving 60 to a rinse solution. The rinse solution may be in a bucket, in which case the valving 60 is submerged in the bucket, or it may be in a box identical to the product boxes 40, in which case the valves 60 would be connected to the rinse boxes in the same way as they were connected to the product boxes 40.

The respective dispensing heads 18, 20, 22 may be connected to discharge hoses leading to a sink or drain, or a bucket may be put under the dispensing heads 18, 20, 22 to catch the rinse solution which comes out of the dispensing heads. The operator then pushes the "clean" button on the control panel 25 (again, there is a separate control panel 25 for each freezer 32, so the operator may be pushing the "clean" buttons on both panels 25 to clean both freezers at the same time). The "clean" button communicates with the central processor 186, which then runs the machine through a timed cycle. At the beginning of the clean cycle, the "clean" button is pressed, and the central processor then initiates the product pump-out sequence. In this sequence, the pump operates in the reverse direction for a certain time period, during which all liquid product is pumped back into the box 40. Also, during this sequence, the respective dispensing head 18 or 22 must be opened to allow the ice cream to be pumped out (so the pump is not trying to pull a vacuum). Then, the vent valves 180 must be manually lifted up to permit the gas in the freezers 32 to escape until the freezers 32 fill up with rinse solution. Then the vent valves 180 are closed.

The timed cycle runs the pumps 62 and the motors 36, running the rinse solution through the entire path that the product takes, from the valving 60 through to the dispensers 18, 20, 22. The timed cycle includes opening and closing the dispenser valves 18, 20, 22 so that rinse solution goes through the entire system. Then, the pumps 62 run in reverse to drain the rinse solution out of the machine. Then a light on the "clean" button flashes to tell the operator that it is time to start the next part of the cleaning process.

Next, the rinse solution is disconnected from the valves 60 and is replaced with cleaning solution, the "clean" buttons are pushed again, starting the second cleaning cycle. The vent valves 180 are lifted until the freezers fill up, and the central processor goes through the same procedure as was used with the rinse solution but with cleaning solution. The cleaning solution is agitated in the freezer 32, goes out the dispensers, and, at the end of the timed cycle, the pump 62 is reversed, to drain cleaning solution out of the machine. Then, the "clean" light flashes again.

Next, the cleaning solution is disconnected from the valves 60, and a sanitizing solution is connected to the valves 60. The "clean" button or buttons are pushed again, starting the sanitizer part of the cleaning cycle, and the vent valves 180 lifted up again until sanitizing solution squirts out the openings 191, at which point the vent valves 180 are closed again, and the timed sequence repeats, turning the pump on and off, opening and closing the dispenser valves, agitating the sanitizing solution with the damper, and so forth, until the sanitizing solution is pumped back out. Again, the "clean" light flashes, telling the operator that another step must be taken.

Next, the operator disconnects the sanitizing solution, connects a cold water rinse, pushes the "clean" button again and the machine then goes through the whole timed sequence again. At the end of this final sequence, the "clean" light goes out.

Now, the product path is clean. The machine may be stored at this point, or it may be reconnected to product boxes 40. The connectors 60 should be dipped into sanitizer solution prior to being connected to new product. The "on" button must be pushed to start the machine up again.

Since the liquid mix is kept refrigerated at all times and is connected aseptically to the machine 10, and since the gas that is mixed with the liquid mix is pure, uncontaminated gas, the product is very clean and can stay in the machine for a much longer period of time than can prior art soft-serve machines before any bacteria begins to build up in the product. Therefore, it is anticipated that these machines will be able to operate for a much longer time than prior art machines before they need to be cleaned. When they do need to be cleaned, the cleaning is a very simple process, as described above, which does not require disassembly of the machine. This will save a tremendous amount of labor and will ensure that the machines actually are cleaned as they should be in order to maintain a clean product.

Figure 11:
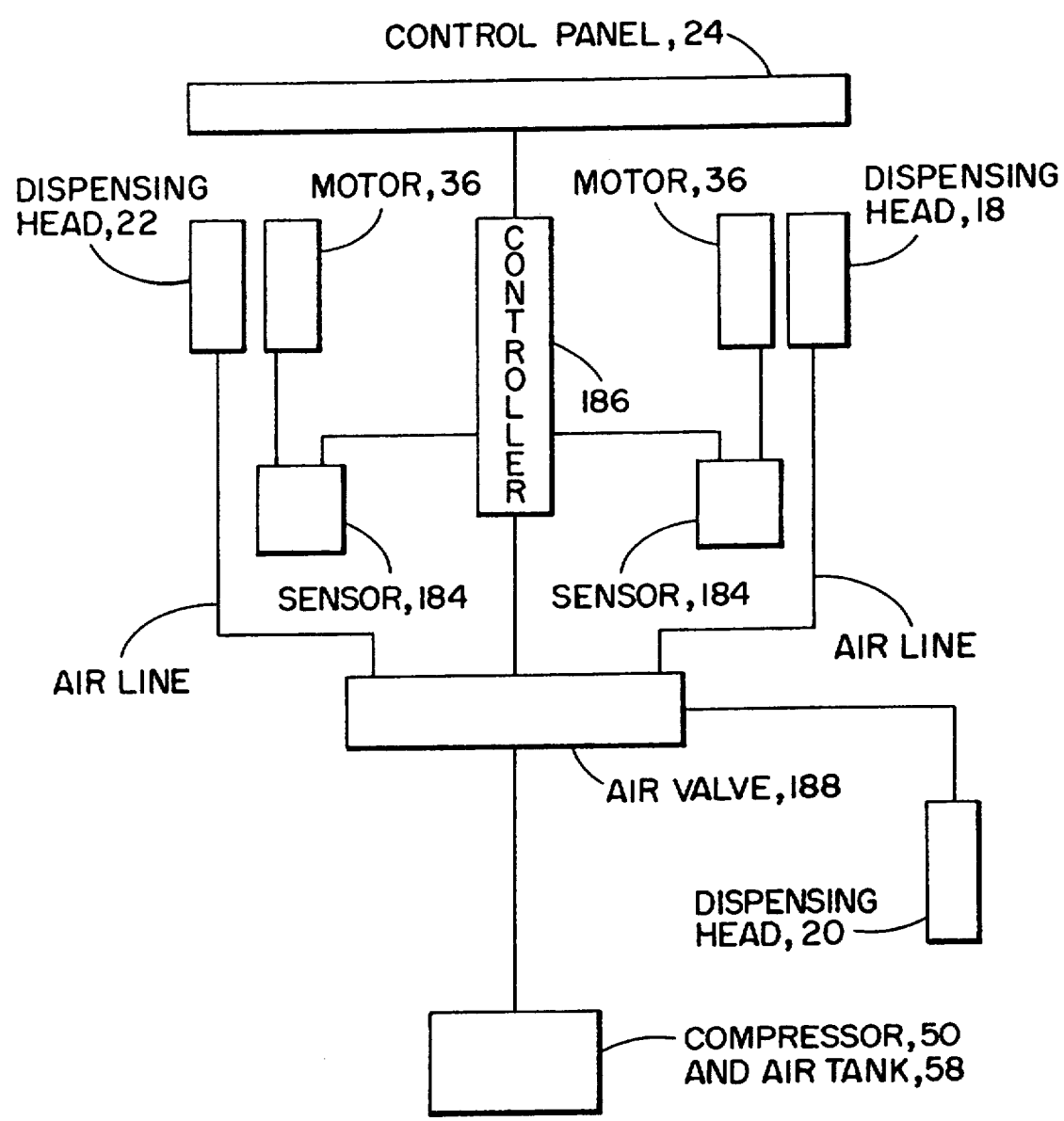
FIG. 11 is a schematic diagram of the dispenser control.

FIG. 11 is a schematic diagram showing the control for the dispensers 18, 20, 22. The control panel on the front of the machine includes the three sets of dispenser control buttons 24 and two sets of machine control buttons 25. The sensors 184 are connected to their respective drive motors 36, which drive the dashers in the freezers. The sensors 184 sense the amount of current that is drawn by the motors 36 as they drive the dashers 132. The amount of current drawn by the motors corresponds to the viscosity of the product in the freezer, so, when the product becomes very viscous and it is difficult to drive the dasher, the current draw increases, and the sensor 184 tells the central processor 186 that it should close the solenoid valve which controls the flow of refrigerant to that freezer. If the solenoid valves to both freezers are closed, the central processor 186 will stop the condensing unit. When the product begins to thaw and become less viscous, the current draw drops back down, and the sensors 184 tell the central processor 186 to open in the refrigerant solenoid valve and start the condensing unit if it is not already on. The dispensing heads 18, 20, 22 dispense frozen dessert from the machine. The central, programmable controller 186 controls the dispensing of the frozen dessert from the dispensing heads. The compressor and air tank 50 provide the working fluid for controlling the dispensers. Among the solenoid valves 46 are air valves 188, which provide the compressed air to the dispensing valves 18, 20, 22 and vent air from the dispensing valves 18, 20, 22 to control the dispensing of the frozen dessert.

When the machine operator wants to dispense product from one of the dispensers 18, 20, 22, the operator pushes one of the buttons 24. When the controller 186 receives a signal from one of the buttons 24, it knows which dispenser to open and how long to hold the dispenser open in order to dispense the desired amount. Then, the controller 186 causes the appropriate air valve 188 to open, allowing pressurized working air from the compressor and tank to flow into a particular dispenser, causing that dispenser to open. The controller will keep the dispenser open for a preset period of time and will then close the air valve 188 and allow the pressurized air in the dispenser to be vented, thereby closing the dispensing valve. The portion size for any given button 24 can easily be reprogrammed by the machine operator by holding the continuous flow button and the small, medium or large button for the desired amount of time. That new time will be put in memory and will not change until the operator repeats that procedure. This permits the operator to have tight control over the portion size for any given frozen dessert product.

The dispenser buttons 24 are labelled "small", "medium", "large", and "flow". The small, medium and large are programmed portion sizes, and "flow" is a continuous flow button, which might be used to fill a very large container with product, for example. The continuous flow button holds open the dispensing head as long as it is depressed. It is also used to program the other buttons as described above.

Some of the machine control buttons 25 have already been described. The "low product" light comes on when the switching valve 41 switches from one box of mix 40 to another, telling the operator that one box of mix 40 is empty and must be replaced. When the operator replaces the box 40, he pushes the reset button to turn off the "low product" light.

When the pressure sensor on the bottled gas senses a drop in pressure in the bottle, it communicates with the central controller 186, which turns on the "low product air" light. The operator then switches the machine over to the other bottle of gas, and the pressure switch is reset because of adequate pressure from the new bottle.

If the product temperature in the refrigerated compartment gets too high, the product temperature light will come on, shutting the machine down and requiring maintenance. If a hose breaks or some other problem occurs, causing a pressure drop, the "system fault" light will come on, shutting the machine down and requiring maintenance.

Figure 12:
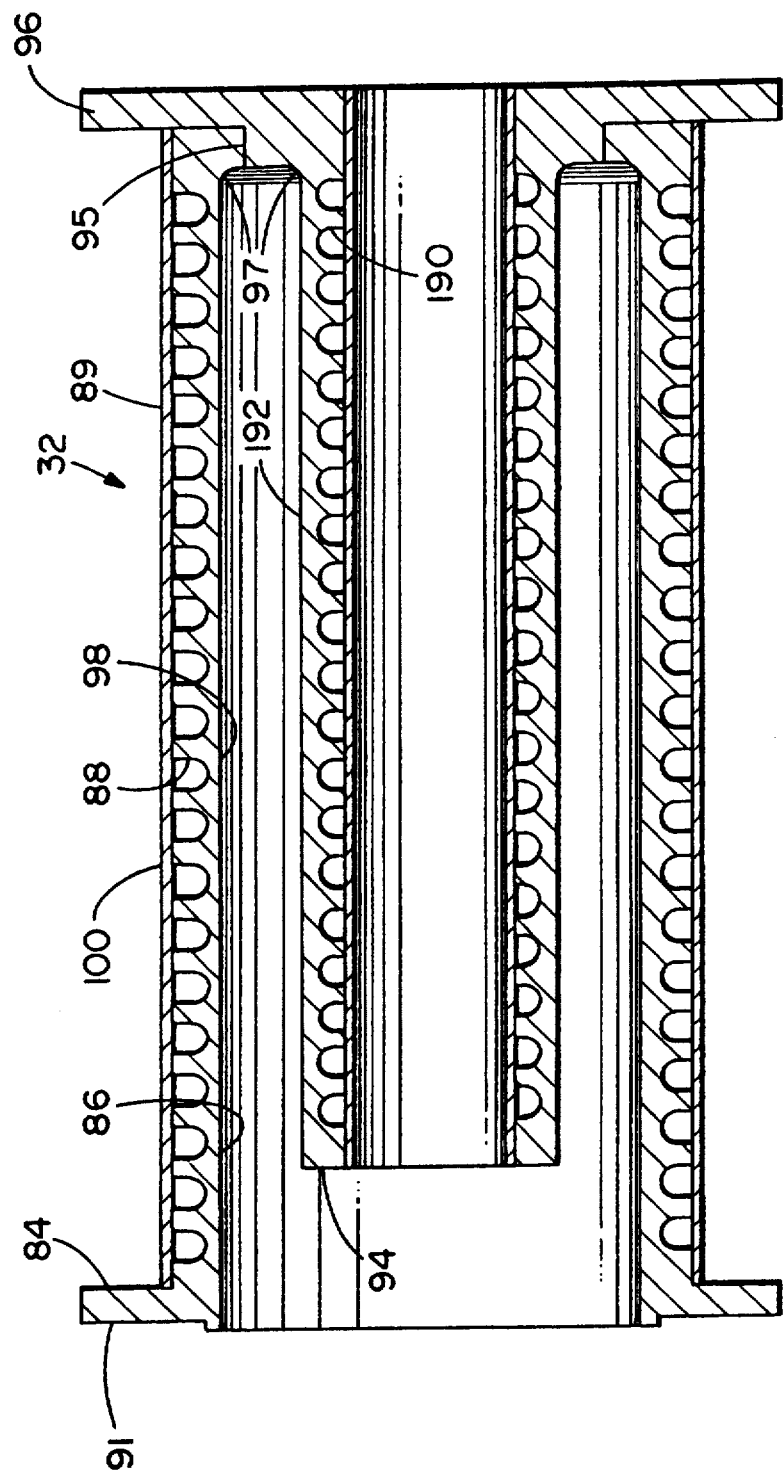
FIG. 12 shows a side sectional view of the freezer in a second embodiment of the invention in which refrigerant also circulates in the inner core of the freezing chamber.

In a second embodiment of the invention, shown in FIG. 12, the freezer 32 is essentially the same as the freezer shown in FIG. 6, except that refrigerant also circulates in a coil 190 in the inner core 94, creating an inner heat transfer surface 192 in the product chamber 98 of the freezer 32.

It will be obvious to those skilled in the art that the machine described above may be modified without departing from the scope of the present invention.

What is claimed is:

1. A frozen dessert machine, comprising:
   a freezing chamber; and
   an automated dispensing valve at the front of said freezing chamber for dispensing product from said freezing chamber;
   said automated dispensing valve including a dispenser tube; a shaft movable inside said tube between an open and a closed position; a control fluid inlet to said tube; a frozen dessert inlet to said tube; and a frozen dessert outlet from said tube; such that, when control fluid enters said tube, it causes said shaft to move relative to said tube, and, when frozen dessert enters said tube and said valve is in the open position, said valve provides an open path through which the frozen dessert can flow from the frozen dessert inlet to the frozen dessert outlet;
   said frozen dessert machine also including a control fluid line, and a face plate, wherein said dispensing valve is on the face plate and the face plate is mounted on the frozen dessert machine such that, when said face plate is mounted on the front of said frozen dessert machine, the connection from the control fluid line to the control fluid inlet and the connection from the freezing chamber to the frozen dessert inlet are automatically made.

2. A frozen dessert machine as recited in claim 1, wherein said dispensing valve is fluid-operated.

3. A soft-serve frozen dessert machine as recited in claim 2, and further comprising a central controller and a plurality of buttons on said machine which communicate with the central controller to tell the central controller the portion size to be dispensed.

4. A soft-serve frozen dessert machine as recited in claim 3, and further comprising at least one fluid control valve in communication with said central controller, said fluid control valve opening and closing to provide the operating fluid to said fluid-controlled dispensing valve.

5. A soft-serve frozen dessert machine as recited in claim 4, and further comprising a sensor for sensing the viscosity of the product in the freezing chamber, said sensor being in communication with said central controller.

6. A device for making and dispensing a frozen dessert product, comprising:
   a freezing chamber;
   a dispensing unit positioned adjacent to the front of said freezing chamber and defining a passageway in communication with said freezing chamber, with one end of said passageway opening into said freezing chamber and the other end of said passageway defining an exit for dispensing product outside of said device; said unit having a fluid-operated valve member in communication with said passageway;
   said dispensing unit being located on a face plate which is mounted on the front of said freezing chamber, with seals between the face plate and the freezing chamber which, when said face plate is mounted on the front of said freezing chamber, automatically make the connections between said dispensing unit and the fluid for operating the fluid-operated valve and between said dispensing unit and the passageway to the freezing chamber; and
   a central controller and a control valve controlled by the central controller for selectively permitting the flow of working fluid to said fluid-operated valve member.

7. A device as recited in claim 6, and further comprising a compressed air supply in communication with said dispensing unit so as to supply compressed air as the working fluid.

8. A device as recited in claim 6, wherein said fluid-operated valve member includes a movable seal, which, in its normal position, closes said passageway so as to prevent frozen dessert from passing through said passageway and leaving the device.

9. A device as recited in claim 6, and further comprising a second valve, in addition to said fluid-operated valve member, said second valve communicating with the upper portion of the freezer and with atmosphere, said second valve being adapted to vent air from the freezer when it is being filled with frozen dessert or with cleaning fluid and to be closed during normal operation of the device.

10. A device as recited in claim 6, and further comprising:
    a mixing chamber, including a liquid inlet; a gas inlet downstream from the liquid inlet; a tortuous path downstream of the gas inlet for mixing together the liquid and gas and breaking the gas into small bubbles; and a product outlet downstream of said tortuous path;
    wherein the product outlet of the mixing chamber is upstream of and in fluid communication with the inlet of the freezing chamber.

11. A device as recited in claim 10, and further comprising:
    a pump in communication with said liquid inlet for pumping liquid into the inlet, said pump being controlled by said central controller.

12. A device as recited in claim 11, and further comprising: a bottle of pressurized gas in fluid communication with the gas inlet; a gas valve between said bottle of pressurized gas and the gas inlet; said gas valve being controlled by said central controller.

13. A device as recited in claim 12, and further comprising: a compressor for compressing refrigerant to cool the freezer, said compressor being controlled by said central controller.

14. A device as recited in claim 13, wherein said central controller is programmed to run a clean-in-place routine, in which fluid is pumped through the mixing chamber, freezing chamber and dispenser, the dispenser valve is opened and closed, and the pump is reversed to pump fluid back out of the device.

* * * * *